(12) United States Patent
Bolenbaugh

(10) Patent No.: US 8,838,313 B2
(45) Date of Patent: Sep. 16, 2014

(54) EXTENDED-RANGE ELECTRIC VEHICLE WITH MECHANICAL OUTPUT CLUTCH

(75) Inventor: Jonathan M. Bolenbaugh, Hartland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 18 days.

(21) Appl. No.: 13/543,029

(22) Filed: Jul. 6, 2012

(65) Prior Publication Data

US 2014/0012443 A1 Jan. 9, 2014

(51) Int. Cl.
| | |
|---|---|
| *B60L 11/00* | (2006.01) |
| *B60L 11/02* | (2006.01) |
| *B60L 11/04* | (2006.01) |
| *B60L 11/08* | (2006.01) |

(52) U.S. Cl.
CPC ............. *B60L 11/00* (2013.01); *B60L 11/08* (2013.01); *B60L 11/04* (2013.01); *B60L 11/02* (2013.01); *Y10S 903/911* (2013.01); *Y10S 903/93* (2013.01)
USPC .............................. 701/22; 903/911; 903/930

(58) Field of Classification Search
CPC ..... B60W 20/00; B60W 10/02; B60W 10/06; B60W 10/08; B60W 20/1084; F16H 3/728; F16H 45/00; F16H 57/0006; B60K 6/48; B60K 6/365; B60K 6/445; B60K 6/387; B60K 6/485; B60K 6/547; F02N 11/04; F02N 15/046; B60T 8/17555
USPC .............. 701/22; 475/3, 5; 477/3, 5; 137/560
See application file for complete search history.

(56) References Cited

U.S. PATENT DOCUMENTS

| | | | |
|---|---|---|---|
| 6,510,370 B1* | 1/2003 | Suzuki et al. ................... 701/22 |
| 2003/0104900 A1* | 6/2003 | Takahashi et al. ................ 477/3 |
| 2008/0207372 A1* | 8/2008 | Holmes et al. .................... 475/5 |
| 2008/0280726 A1* | 11/2008 | Holmes et al. .................... 477/5 |
| 2010/0227722 A1* | 9/2010 | Conlon ............................ 475/5 |
| 2012/0130581 A1* | 5/2012 | Semsey et al. .................. 701/22 |
| 2013/0087225 A1* | 4/2013 | Frait et al. ..................... 137/560 |
| 2013/0297123 A1* | 11/2013 | Gibson et al. .................. 701/22 |
| 2014/0012443 A1* | 1/2014 | Bolenbaugh ..................... 701/22 |

* cited by examiner

*Primary Examiner* — Tuan C. To
*Assistant Examiner* — Yuri Kan
(74) *Attorney, Agent, or Firm* — Quinn Law Group, PLLC

(57) ABSTRACT

A vehicle includes an engine, battery module, stationary member, first and second motor generator units (MGUs), three clutches, a planetary gear set, an output member, and a controller. The first MGU is in series with the engine. The three clutches include a brake, a rotating clutch, and a passive one-way clutch between the brake and the stationary member. The brake is between the one-way clutch and a first node of the gear set. The second MGU connects to a third node of the gear set. The second node is connected to the output member. The controller executes a method to select between powertrain modes, including first and second modes each with an electric vehicle (EV) and a series hybrid state, and a third mode that is a parallel hybrid mode. A method is also disclosed for selecting between the series and parallel powertrain modes using the clutch set.

14 Claims, 1 Drawing Sheet

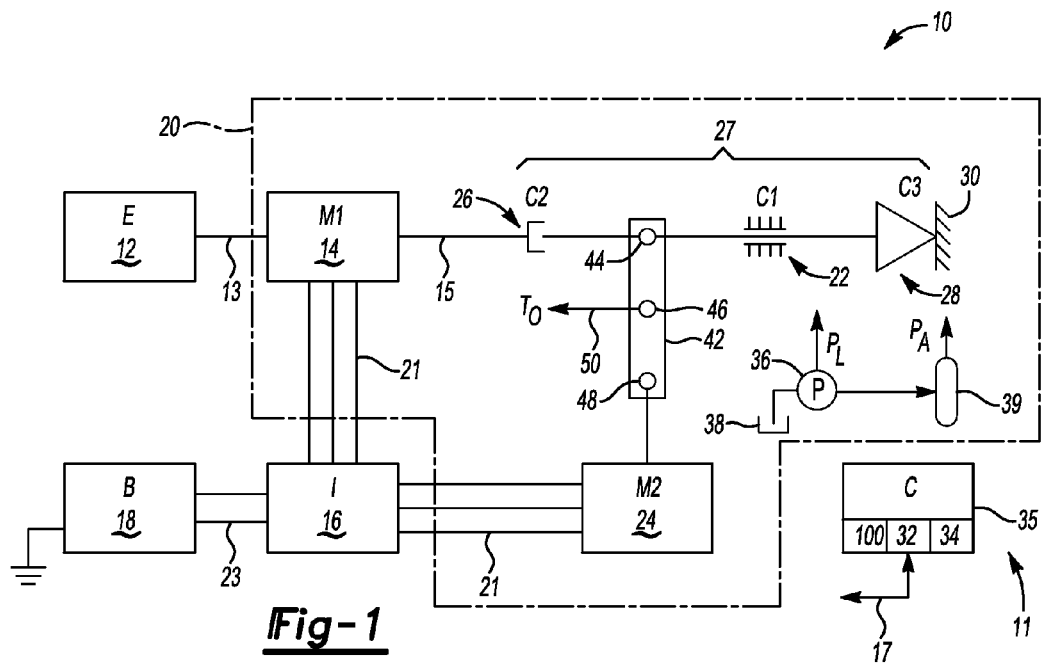
*Fig-1*
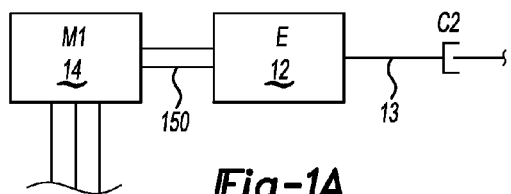
*Fig-1A*
| * | C1 | C2 | C3 | M1 | M2 | E |
|---|----|----|----|----|----|---|
| 1E | O | O | L | 0 | + | 0 |
| 1S | O | O | L | − | + | + |
| 2E | X | O | U | 0 | +/− | 0 |
| 2S | X | O | U | − | +/− | + |
| 3P | O | X | U | +/− | +/− | + |
*Fig-2*
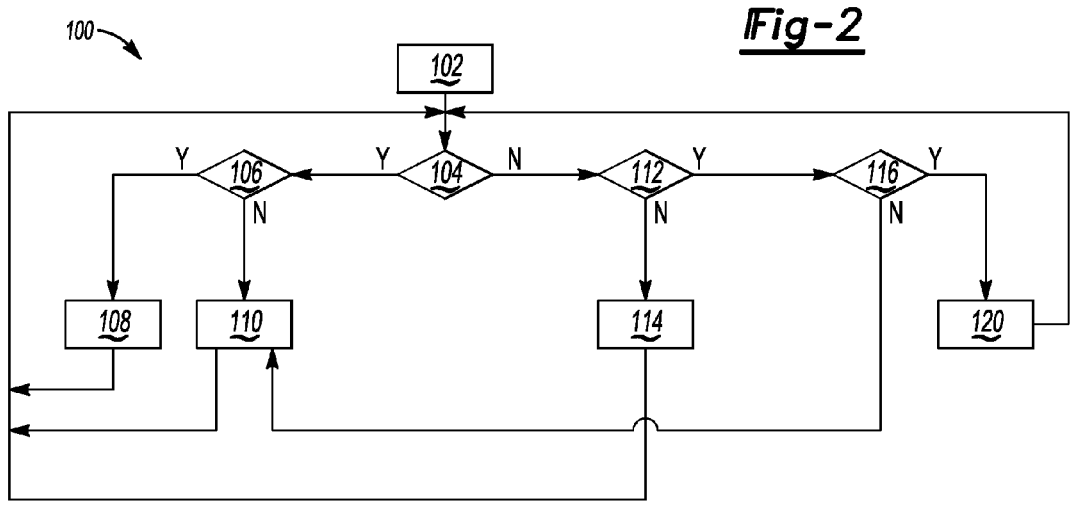
*Fig-3*

EXTENDED-RANGE ELECTRIC VEHICLE WITH MECHANICAL OUTPUT CLUTCH

TECHNICAL FIELD

The present disclosure relates to an extended-range electric vehicle having a mechanical output clutch.

BACKGROUND

Automotive vehicles are conventionally powered via an internal combustion engine that acts as the sole source of the torque needed for propelling the vehicle. However, battery electric, hybrid electric, and extended-range electric vehicles all have emerged as viable fuel efficient alternatives to the conventional gas-powered vehicle. Unlike battery electric vehicles, hybrid electric and extend-range electric vehicles retain a gas engine as part of the powertrain. Strong hybrid electric vehicles continue to use engine torque for propulsion, for instance at higher speeds when electric motors become relatively inefficient. Mild/weak hybrid electric vehicles use a motor to start the engine after an autostop event, but otherwise power the vehicle conventionally.

An extended-range electric vehicle, unlike a typical strong or mild hybrid, uses a smaller gas engine as an electrical power generator when additional charging of an onboard battery module is required. An extended-range electric vehicle may use multiple electric traction motors as part of its powertrain. When the battery module is depleted, the engine may be automatically started and used to generate electrical energy. The electrical energy may be directed to the battery module and/or used to deliver input torque to a transmission depending on the mode. In this manner, the engine is used to extend the vehicle's effective electric operating range.

SUMMARY

A vehicle is disclosed herein that includes an internal combustion engine, a battery module, a transmission, and a controller. The transmission includes a stationary member, an output member, and first and second motor/generator units (MGUs), with the first MGU in series with the engine. The transmission also includes a planetary gear set and three clutches. The first clutch is a brake connected to the third clutch and to a first node of the planetary gear set. The second clutch is a rotating clutch connected between the first MGU and the first node. The third clutch is a passively-actuated one-way clutch that is connected to the stationary member and to an output side of the first clutch. The output member and the second MGU are respectively connected to the second and third nodes of the planetary gear set.

The controller includes a processor and a tangible, non-transitory memory device on which is recorded a set of computer-executable instructions. The processor selectively executes the instructions from the memory device to thereby select between three powertrain operating modes, two of which have an electric vehicle (EV) state and a series hybrid state, and the third of which is a parallel hybrid mode.

In the EV state of the first mode, i.e., the first EV state, the first and second clutches are both open. The engine runs in the first series hybrid state. In both states of the first mode, the third clutch is loaded and the second MGU provides positive output torque to the output member.

The second mode includes the second EV and series hybrid states. In the second EV state, only the first clutch is closed. The second clutch is thus open and the third clutch freewheels. A negative/regenerative torque is selectively commanded via the second MGU to charge the battery module or to provide regenerative braking. In the second series hybrid state, the first clutch remains closed, the engine runs, and the third clutch freewheels.

In the third mode, i.e., the parallel hybrid mode, the second clutch is engaged, the engine is on, and at least one of the MGUs provides positive or negative output torque to the output member. The first clutch remains open and the third clutch freewheels. Execution of the instructions by the processor, e.g., in response to receipt by the controller of an axle torque request, causes the controller to select between the different modes and/or states, and to control an operation of the transmission according to the selected mode or state.

A method is also disclosed for controlling the transmission noted above, as is a system having the transmission and controller.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic illustration of an example extended-range electric vehicle configured as set forth herein.

FIG. 1A is a schematic illustration of an alternative portion of a powertrain usable within the vehicle shown in FIG. 1.

FIG. 2 is a table describing multiple powertrain operating modes and states of the vehicle shown in FIG. 1.

FIG. 3 is a flow chart of an example method for selecting and executing a powertrain operating mode in the vehicle shown in FIGS. 1 and 1A.

DETAILED DESCRIPTION

Referring to the drawings, wherein like reference numbers refer to like components in the several Figures, an example extended-range electric vehicle 10 is shown in FIG. 1. The vehicle 10 uses a controller (C) 35 to automatically select and execute a powertrain operating mode from a plurality of such modes, all of which are described in detail below with reference to FIG. 2. The vehicle 10 includes an internal combustion engine (E) 12 and an automatic transmission 20 having a case or other stationary member 30. The controller 35 selects an operating mode, or a state within a given mode, according to a method 100, an example of which described in detail below with reference to FIG. 3.

The vehicle 10 shown in FIG. 1 includes a high-voltage rechargeable battery module (B) 18, e.g., a 60 VDC to 300 VDC or higher voltage multi-cell battery module, which may be electrically connected via a DC bus 23 to other high-voltage power components of a transmission 20 via a power inverter module (I) 16. The controller 35 is in communication with the various components of the vehicle 10 via control and feedback signals (double-headed arrow 17).

The example transmission 20 of FIG. 1 includes respective first and second electric motor/generator units (MGUs) 14 and 24. For illustrative clarity, the first MGU 14 is also labeled M1 in FIGS. 1 and 2, while the second MGU 24 is also labeled M2 in the same Figures. Both devices may be poly-phase electric machines that are controlled as needed by the controller 35 so as to selectively recharge the battery module 18 and/or provide regenerative braking when needed.

The example embodiment of FIG. 1 places the first MGU 14 in series with the output of the engine 12, with "in series" as used herein referring to the relative positioning, with respect to the driveline, of the first MGU 14 and the engine 12. A drive shaft 13 of the engine 12 powers the first MGU 14 whenever the engine 12 is running, and thus allows the first MGU 14 to function as an electrical generator. However, while the engine 12 and MGU 14 are always positioned in series with each other with respect to the driveline, the configuration of FIG. 1 is not the only possible series configuration.

Referring briefly to FIG. 1A, the relative series positioning of the engine 12 and the first MGU 14 may be reversed as shown to provide a belted alternator starter (BAS) configuration. In such a configuration, the first MGU 14 draws electrical power from the battery module 18 to restart the engine 12, for instance by rotating a belted output member 150 that is connected to the engine 12. This alternative approach places the first MGU 14 outside of the transmission 20 and thus forms a mild hybrid function, a term that is described above and well known in the art.

Referring again to FIG. 1, when the vehicle 10 is generating a negative/regenerative torque, as opposed to positive torque used to propel the vehicle 10, electrical energy is delivered to the inverter module 16 via an AC bus 21, where it is converted, via rapid semiconductor switching, pulse-width modulation, or other means, into a DC voltage suitable for storage in the battery module 18. The vehicle 10 may include other powertrain elements not shown in FIG. 1, for instance an auxiliary power module that reduces the DC voltage to auxiliary levels for powering 12 VDC vehicle systems and/or other power conditioning components.

The transmission 20 shown in FIG. 1, which combines with the controller 35 to form a system 11, includes first, second, and third clutches 22, 26, and 28, respectively, and a single planetary gear set 42. For illustrative clarity, the first clutch 22 is also labeled in FIG. 1 as clutch C1, while the second and third clutches 26 and 28 are respectively labeled as clutch C2 and C3. The clutches 22, 26, and 28 are actuated, either alone or in a particular combination as shown in FIG. 2, to establish a desired powertrain operating mode or state, whether EV, series hybrid, or parallel hybrid, as well as to facilitate regeneration of the battery module 18.

The planetary gear set 42 may include first, second, and third nodes 44, 46, and 48, respectively. In a particular embodiment, the first node 44 may be a ring gear, the second node 46 may be a planetary carrier, and the third node 48 may be a sun gear. In such an example embodiment, the sun gear/third node 48 may be connected to an output member of the second MGU 24, while the transmission output member 50 is connected to the planetary carrier/second node 46 and delivers transmission output torque $T_O$ via the second node 46. The first MGU 14 may be connected to the ring gear/node 44 via the second clutch 26.

The first clutch 22 and the second clutch 26 embody a brake and a rotating clutch, respectively. Both clutches 22 and 26 may be hydraulically-actuated. The transmission 20 therefore may include a fluid pump (P) 36 that draws transmission fluid from a sump 38 and delivers the fluid at line pressure (arrow $P_L$) to a hydraulic accumulator 39, as well as to the second clutch 26. Fluid from the accumulator 39 may be delivered as needed to the first clutch 22, almost instantaneously, at accumulator pressure (arrow $P_A$). Use of the accumulator 39 may be beneficial during regeneration of the battery module 18.

The remaining clutch, i.e., the third clutch 28, is a one-way clutch, for instance a freewheeling device such as a diode, roller, or sprag clutch. As used herein, the term "one-way clutch" refers to a passively-actuated freewheeling element, i.e., a device that freewheels in one rotational direction and that loads, i.e., locks, in the other rotational direction. The third clutch 28 is connected on one side to a stationary member 30 of the transmission 20, and also to the output side of the first clutch 22.

Still referring to FIG. 1, the engine 12 is connected in series to the first MGU 14 via the drive shaft 13, which always rotates at engine speed. A motor output member 15 of the first MGU 14 is connected to the second clutch 26. The output member 50 of the transmission 20 is thus driven in various powertrain operating modes via the planetary gear set 42 by the engine 12, the first MGU 14, and/or the second MGU 24.

The controller 35 of FIG. 1 selectively executes the present method 100, for instance by executing computer-executable code or instructions recorded in a tangible, non-transitory memory device(s) 32. The controller 35 may include additional elements such as a processor 34 in communication with the memory device 32. The memory device 32 may include any tangible magnetic or optical storage media, such as but not limited to read only memory (ROM), electrically-programmable read-only memory (EPROM), flash memory, and the like.

The controller 35 may also include sufficient transitory memory such as random access memory (RAM) so that transient signals, which are not considered storage media herein, may be transmitted, received, and processed as needed in executing the present method 100. The controller 35, whether configured as a single computer device or a distributed system, may include any other required components, e.g., high-speed clocks, timers, analog-to-digital (A/D) circuitry, digital-to-analog (D/A) circuitry, digital signal processors, and any necessary input/output (I/O) devices and/or other signal conditioning and/or buffer circuitry.

Referring to FIG. 2, a table 40 describes possible powertrain operating modes (*) of the vehicle 10 shown in FIG. 1, including a first mode with two states (1E, 1S), a second mode with two states (2E, 2S), and a third mode (3P). The first mode (1) may have two different operating states depending on the on/off status of the engine 12, i.e., a first EV state (1E) in which the second MGU 24 acts alone in electrically powering the vehicle 10 using energy from the battery module 18, and a first series hybrid state (1S) in which the engine 12 may be used to charge the battery module 18 via the first MGU 14, via a negative torque (−), while the second MGU 24 provides the required positive output torque (+) for propelling the vehicle 10.

In the first EV state (1E), the first and second clutches (C1) 22 and (C2) 26 of FIG. 1 are both disengaged/opened (O). The third clutch (C3) 28 is passively loaded (L), and is thus locked to the stationary member 30. With the second clutch 26 held open, the first MGU 14 is disconnected from the driveline. The first series hybrid state (1S) may be entered by running the engine 12 and charging the battery module 18 with negative torque (−) from the first MGU 14. Throughout the first mode (states 1E and 1S), the second MGU 24 may continue to provide positive (+) output torque for propelling the vehicle 10.

The second operating mode (states 2E and 2S) provide another EV state and another series hybrid state. The second EV state (2E) requires an engaged (X) first clutch (C1) 22 and an open second clutch (C2) 26. The third clutch 28 freewheels. The second EV state (2E) enables execution of regenerative braking via the second MGU 24 as needed, i.e., the second MGU 24 delivers negative torque as needed for braking or for regeneration of the battery module 18. The engine 12 and the first MGU 14 remain off in the second EV state (2E).

In the second series hybrid state (2S), the engine 12 may be turned on to facilitate charging of the battery module 18 via the first MGU 14. The first clutch 22 remains engaged. Recharging of the battery module 18 is enabled via the first MGU 14. At all times in mode (states 2E, 2S), recharging, propulsion, and regenerative braking remains available from the second MGU 24.

Still referring to FIG. 2, the third mode (3P) is a parallel hybrid mode. In this particular mode, the engine 12 and both MGUs 14 and 24 may be used to provide positive output torque as shown, or negative torque may be provided from either or both devices for regeneration or braking as needed. The second clutch (C2) 26 of FIG. 1 is closed/engaged in mode 3P, and the use of torque from the first MGU 14 is no longer limited to the regeneration of the battery module 18. The third clutch (C3) 28 remains unloaded/freewheeling. The first clutch (C1) 22 remains open.

Thus, use of the third clutch 28 in mode (3P) reduces electrical and mechanical losses during output torque generation, while the use of the first clutch 22 facilitates battery regeneration via the first MGU 14. The second clutch (C2) 26 enables the parallel hybrid propulsion mode (3P). Relative to conventional extended-range electric powertrains, spin losses as well as the losses associated with holding the input clutch closed are largely avoided in the present design.

Referring to FIG. 3, an example embodiment of the present method 100 begins at step 102. With reference to the structure shown in FIG. 1, at step 102 an operator starts the vehicle 10, for instance by depressing a start button or turning an ignition key. Once the vehicle 10 has started, the method 100 proceeds to step 104.

At step 104, with the vehicle 10 started, the controller 35 next determines the state of charge (SOC) of the battery module 18. Step 104 may be executed using conventional techniques such as voltage measurement, current integration, and/or modeling. As part of step 104, the controller 35 determines whether the present SOC is sufficient for EV propulsion, such as by comparing the SOC to a calibrated charge threshold. If the SOC as determined at step 104 is sufficient relative to the threshold, the method 100 proceeds to step 106. Otherwise, the method 100 proceeds to step 112.

At step 106, the controller 35 next determines whether positive axle torque is requested by an operator of the vehicle 10. Step 106 may entail, by way of example, measuring an apply pressure and/or degree of travel of an accelerator pedal of the vehicle 10. The method 100 proceeds to step 108 only if positive axle torque is requested at step 106. Otherwise, the method 100 proceeds to step 110.

At step 108, the controller 35 controls the second MGU 24 of FIG. 1 such that motor output torque from the second MGU 24 is delivered to the transmission output member 50. In this mode, the third clutch (C3) 28 is loaded, i.e., locked to the stationary member 30 and thus passively reacting to the positive output torque provided by the second MGU 24. The method 100 then returns to step 104.

At step 110, the controller 35 closes the first clutch (C1) 22, and the second MGU (M2) 24 reacts against the closed first clutch 26. In this manner, the second MGU 24 can provide negative output torque, either as braking torque or for recharging the battery module 18, during a series hybrid mode. The method 100 then repeats step 104.

At step 112, having determined at step 104 that the SOC of the battery module 18 is insufficient for executing an EV mode, the controller 35 next determines whether a series hybrid mode is an optimal choice relative to the available parallel hybrid mode. Step 112 may entail calculating a solution to an optimization formula. Such an approach may consider, for instance, the present vehicle speed, driver output torque request, the present SOC of the battery module 18, and/or other suitable vehicle control variables. The method 100 proceeds to step 114 if the controller 35 determines that the parallel hybrid mode is the more optimal powertrain mode. However, if the controller 35 determines that series hybrid operation is the optimal mode, the method 100 proceeds instead to step 116.

At step 114, the controller 35 closes the second clutch 26. As shown in FIG. 2, the third mode (3) is entered in which the engine (E) and both MGUs (M1, M2), i.e., elements 12, 14, and 24 of FIG. 1, respectively, output positive torque, which is ultimately delivered to the output member 50. If needed, however, the parallel hybrid operating mode may be used to regenerate the battery module 18, i.e., by diverting some of the excess motor torque from the respective first or second MGUs 14 or 24 to the battery module 18 via the inverter module 16. The method 100 then repeats step 104.

At step 116, the controller 35 determines whether a negative torque request is present, i.e., a braking event or a regeneration of the battery module 18. If so, the method 100 proceeds to step 110. The method 100 otherwise proceeds to step 120.

At step 120, having determined at step 116 that a positive torque request is present, the controller 35 uses the second MGU 24 to propel the vehicle 10, with the third clutch 28 providing any necessary reaction torque to the second MGU 24. At the same time, the engine 12 of FIG. 1 may be turned on and used to charge the battery module 18 via the first MGU 14. The method 100 then repeats step 104.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
an internal combustion engine having a drive shaft;
a rechargeable battery module;
a transmission having:
  a stationary member;
  a first motor/generator unit (MGU) that is directly connected to the drive shaft engine in series with the engine;
  a single planetary gear set having a first, a second, and a third node;
  first, second, and third clutches, wherein the first clutch is a brake connected to the first node, the second clutch is a rotating clutch connected between the first MGU and the first node, and the third clutch is a passively-actuated one-way mechanical output clutch connected to the stationary member and to an output side of the first clutch;
  a second MGU directly connected to the third node; and
  an output member connected to the second node; and
a controller having:
  a processor; and
  a tangible, non-transitory memory device on which is recorded computer-executable instructions for selecting between:
    a first powertrain operating mode having a first electric vehicle (EV) state and a first series hybrid state, wherein the first and second clutches are held open in the first EV state and in the first series hybrid state such that the single planetary gear set is powered solely by the second MGU via the third node, and wherein the third clutch is loaded and the second MGU provides positive output torque to the output member in both the first EV and the first series hybrid states;

a second powertrain operating mode having a second EV state and a second series hybrid state, wherein in the second EV state only the first clutch is closed and a positive and negative torque are selectively provided from the second MGU to respectively power the single planetary gear set and charge the battery module, and wherein in the second series hybrid state the first clutch is closed, with the third clutch freewheeling in both states of the second mode; and a third powertrain operating mode providing a parallel hybrid mode in which only the second clutch is closed, the engine is on, and at least one of the first and the second MGUs provides positive or negative output torque to the output member while the third clutch freewheels;

wherein execution of the instructions by the processor, in response to a received axle torque request by the controller, causes the controller to select between the modes and states, and to control an operation of the transmission according to the selected mode or state.

2. The vehicle of claim 1, wherein the first node is a ring gear, the second node is a planetary carrier, and the third node is a sun gear.

3. The vehicle of claim 1, wherein:
the first MGU includes an output member connected to the engine and configured to start the engine when the first MGU draws electrical power from the rechargeable battery module.

4. The vehicle of claim 1, wherein the first and second clutches are both hydraulically-actuated clutches, the vehicle further comprising:
a fluid pump in fluid communication with the first and second clutches.

5. The vehicle of claim 4, further comprising a hydraulic accumulator positioned between the fluid pump and the first clutch, wherein the first clutch is actuated via the controller using fluid pressure from the hydraulic accumulator.

6. The vehicle of claim 1, wherein the third clutch is a diode clutch.

7. The vehicle of claim 1, wherein the controller is configured to propel the vehicle in the second series hybrid state using torque from the second MGU.

8. A system for use in a vehicle having an internal combustion engine and a rechargeable battery module, wherein the engine has a drive shaft, the system comprising:
a transmission having:
a stationary member;
a first motor/generator unit (MGU) that is directly connected to the drive shaft in series with the engine;
a single planetary gear set having a first, a second, and a third node;
first, second, and third clutches, wherein the first clutch is a brake connected to the first node, the second clutch is a rotating clutch connected between the first MGU and the first node, and the third clutch is a passively-actuated one-way mechanical output clutch connected to the stationary member and to an output side of the first clutch;
a second MGU directly connected to the third node; and
an output member connected to the second node; and
a controller having:
a processor; and
a tangible, non-transitory memory device on which is recorded computer-executable instructions for selecting between:
a first mode having a first electric vehicle (EV) state and a first series hybrid state, wherein the first and second clutches are held open in the first EV state and the first series hybrid state such that the single planetary gear set is powered solely by the second MGU via the third node, and wherein the third clutch is loaded and the second MGU provides positive output torque to the output member in both states of the first mode;
a second mode having a second EV state and a second series hybrid state, wherein in the second EV state only the first clutch is closed and a positive and negative torque are selectively provided from the second MGU to respectively power the single planetary gear set and charge the battery module, and wherein in the second series hybrid state the first clutch remains closed, with the third clutch freewheeling in both states of the second mode; and
a third mode having a parallel hybrid state in which only the second clutch is closed, the engine is on, and at least one of the first and the second MGU provides positive output torque to the output member while the second clutch remains open and the third clutch freewheels;

wherein execution of the instructions by the processor, in response to a received axle torque request by the controller, causes the controller to select between the modes and states, and to control an operation of the transmission according to the selected mode or state.

9. The system of claim 8, wherein the first node is a ring gear, the second node is a planetary carrier, and the third node is a sun gear.

10. The system of claim 8, wherein:
the first MGU includes an output member that is connected to the engine and configured to start the engine when the first MGU draws electrical power from the rechargeable battery module.

11. The system of claim 8, wherein the first and second clutches are both hydraulically-actuated clutches, the vehicle further comprising:
a fluid pump in fluid communication with the first and second clutches.

12. The system of claim 11, further comprising a hydraulic accumulator positioned between the fluid pump and the first clutch, wherein the first clutch is actuated via the controller using fluid pressure from the hydraulic accumulator.

13. The system of claim 8, wherein the third clutch is a diode clutch.

14. The system of claim 8, wherein the controller is configured to propel the vehicle in the second mode, with the first clutch closed, using torque from the second MGU.

* * * * *